March 2, 1971     C. VAN AUSDALL     3,566,590
MACHINE FOR PROPELLING A WORK IMPLEMENT
Original Filed Oct. 24, 1965     6 Sheets-Sheet 1
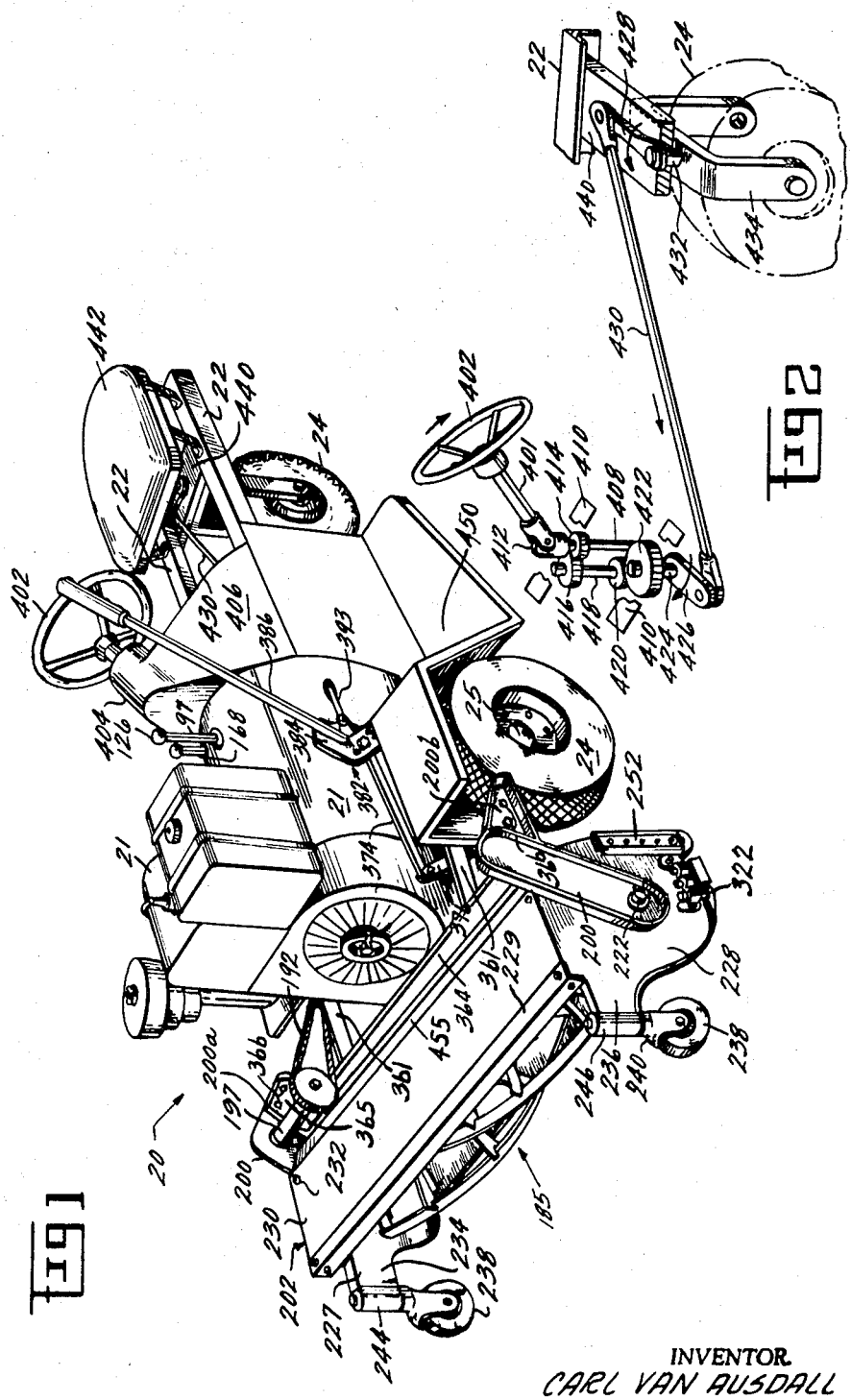
INVENTOR.
CARL VAN AUSDALL
BY
Frank L. Zugelter
ATTORNEY.

March 2, 1971 C. VAN AUSDALL 3,566,590
MACHINE FOR PROPELLING A WORK IMPLEMENT
Original Filed Oct. 24, 1965 6 Sheets-Sheet 2
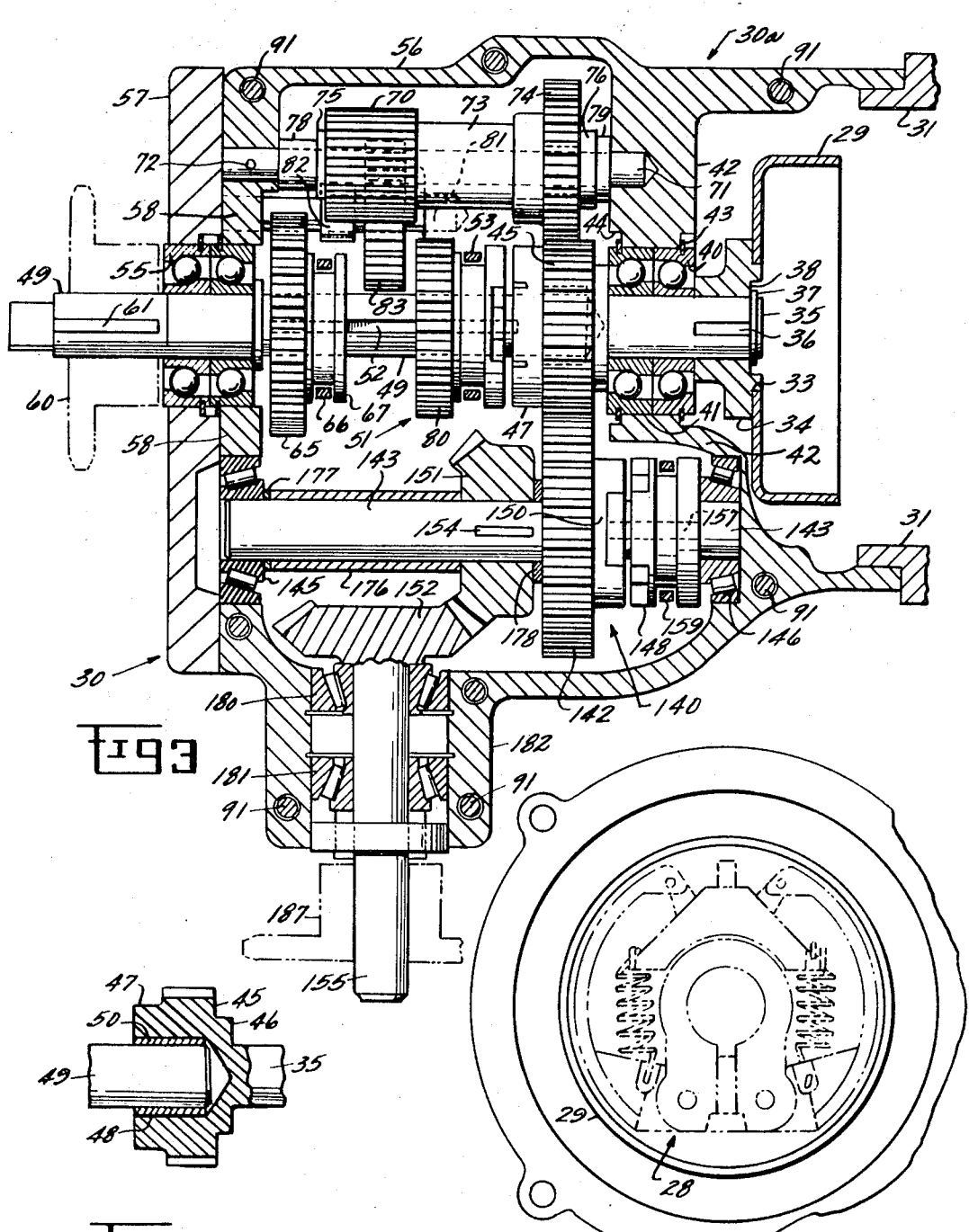
INVENTOR.
CARL VAN AUSDALL
BY
Frank L. Zugelter
ATTORNEY.

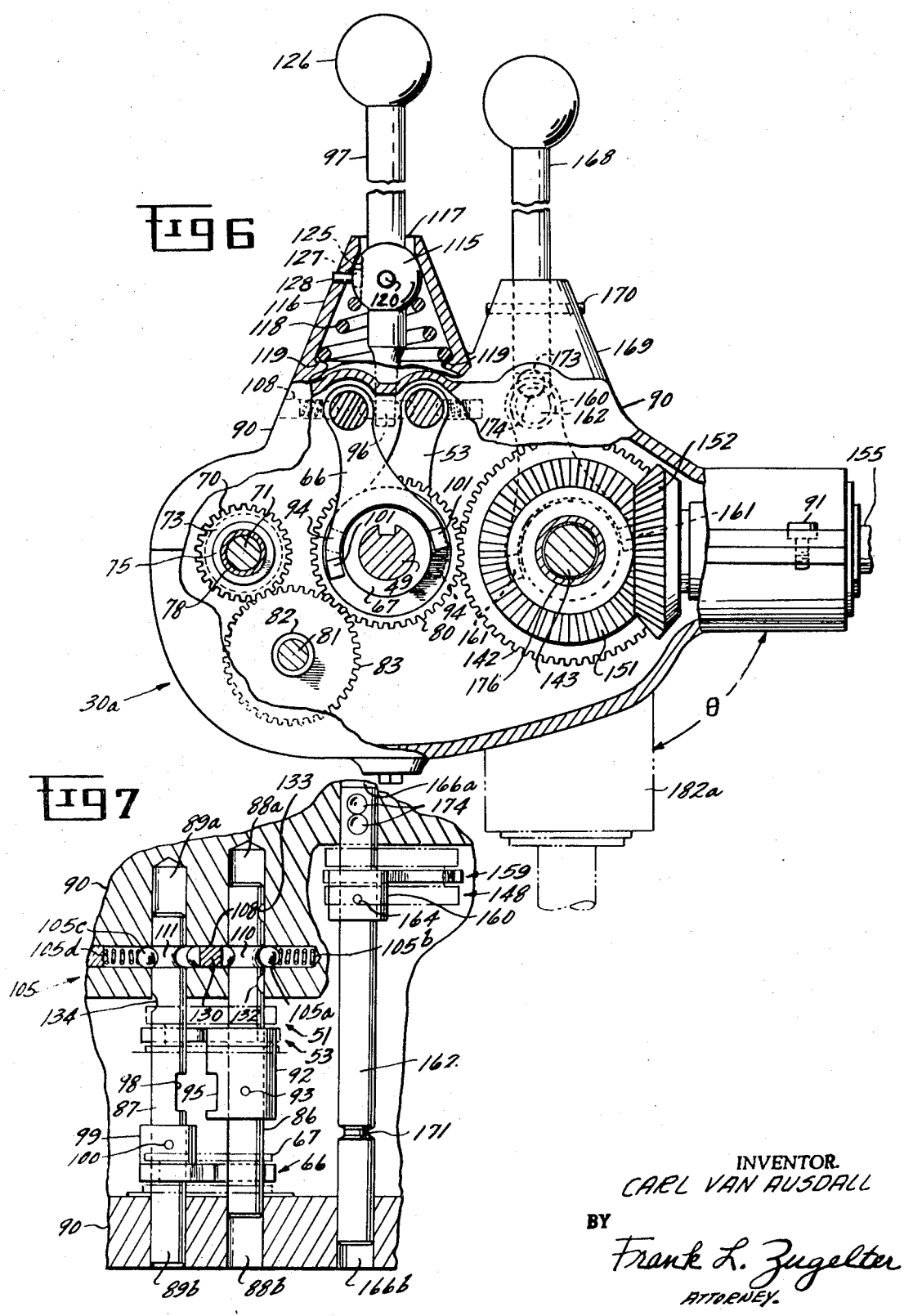

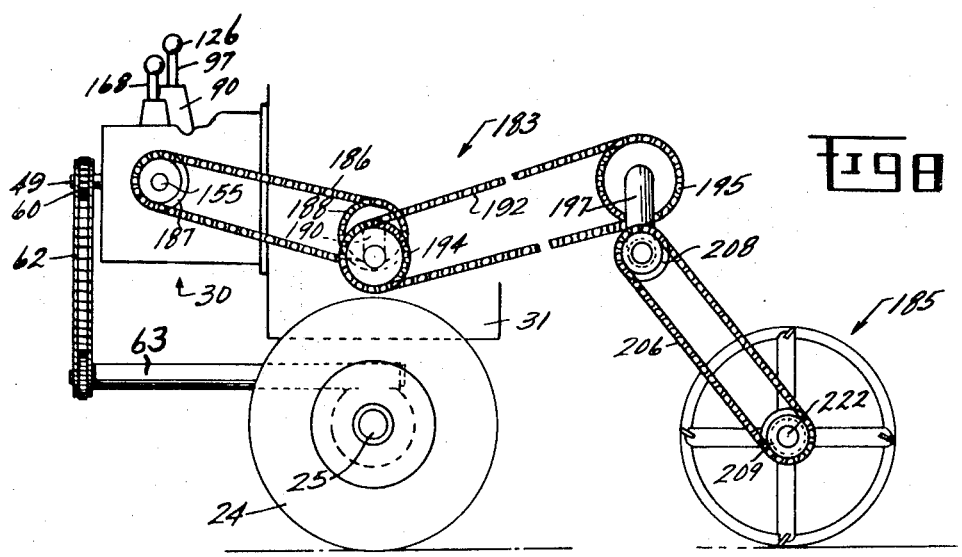
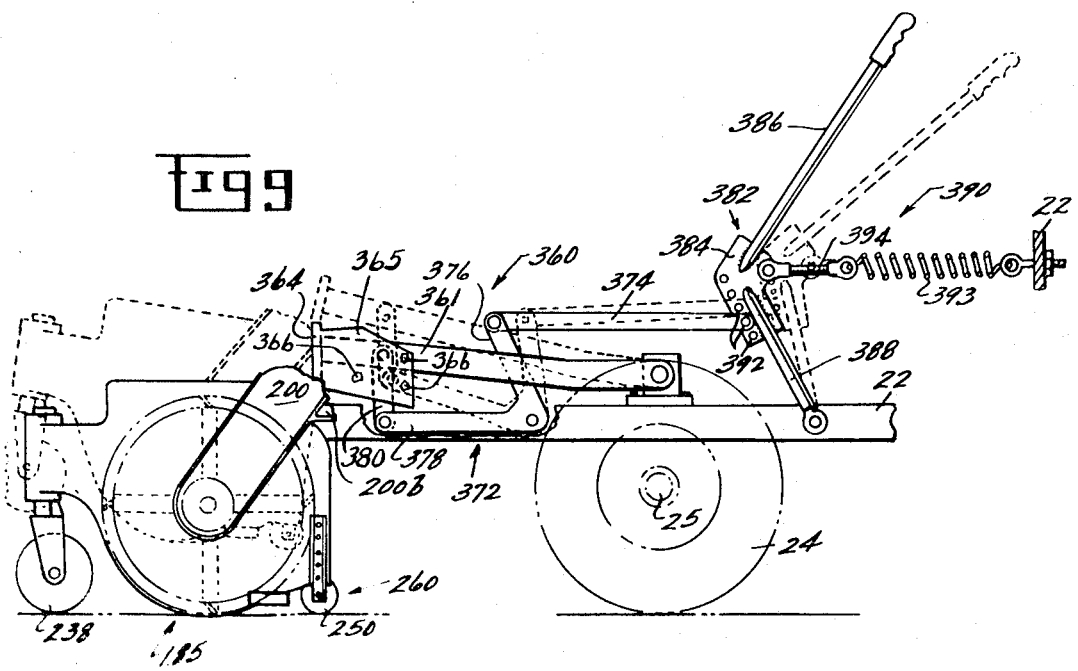

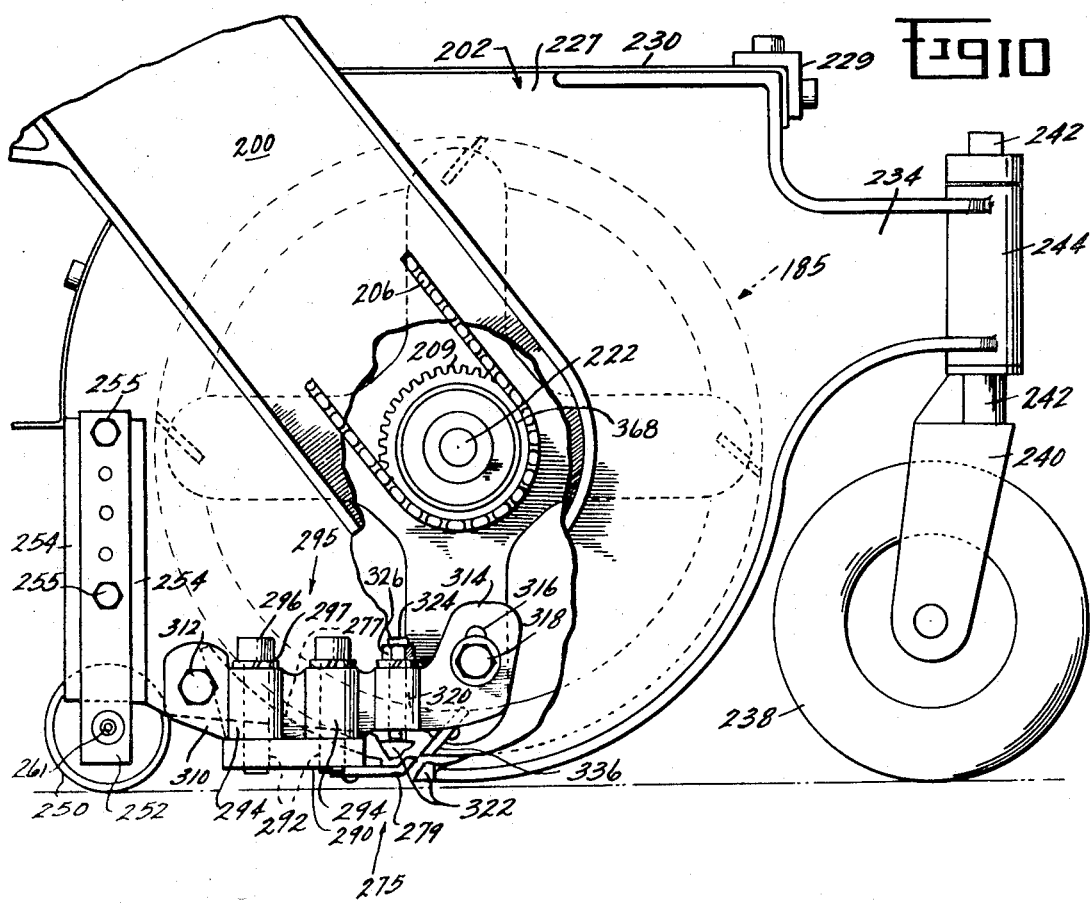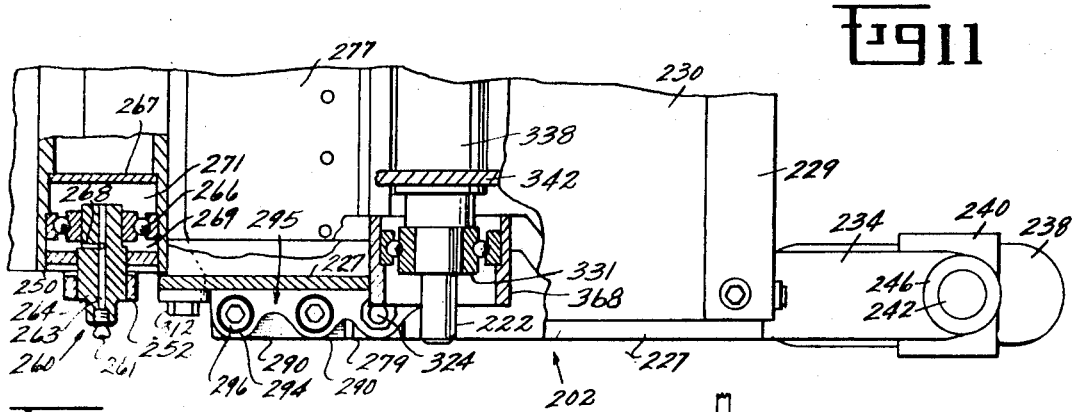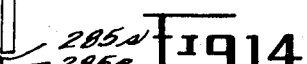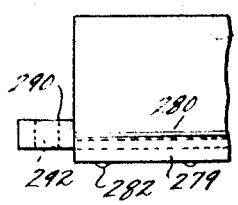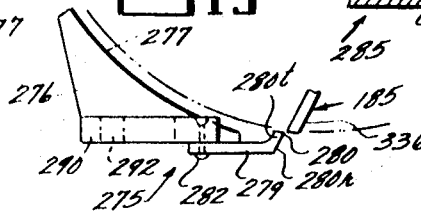

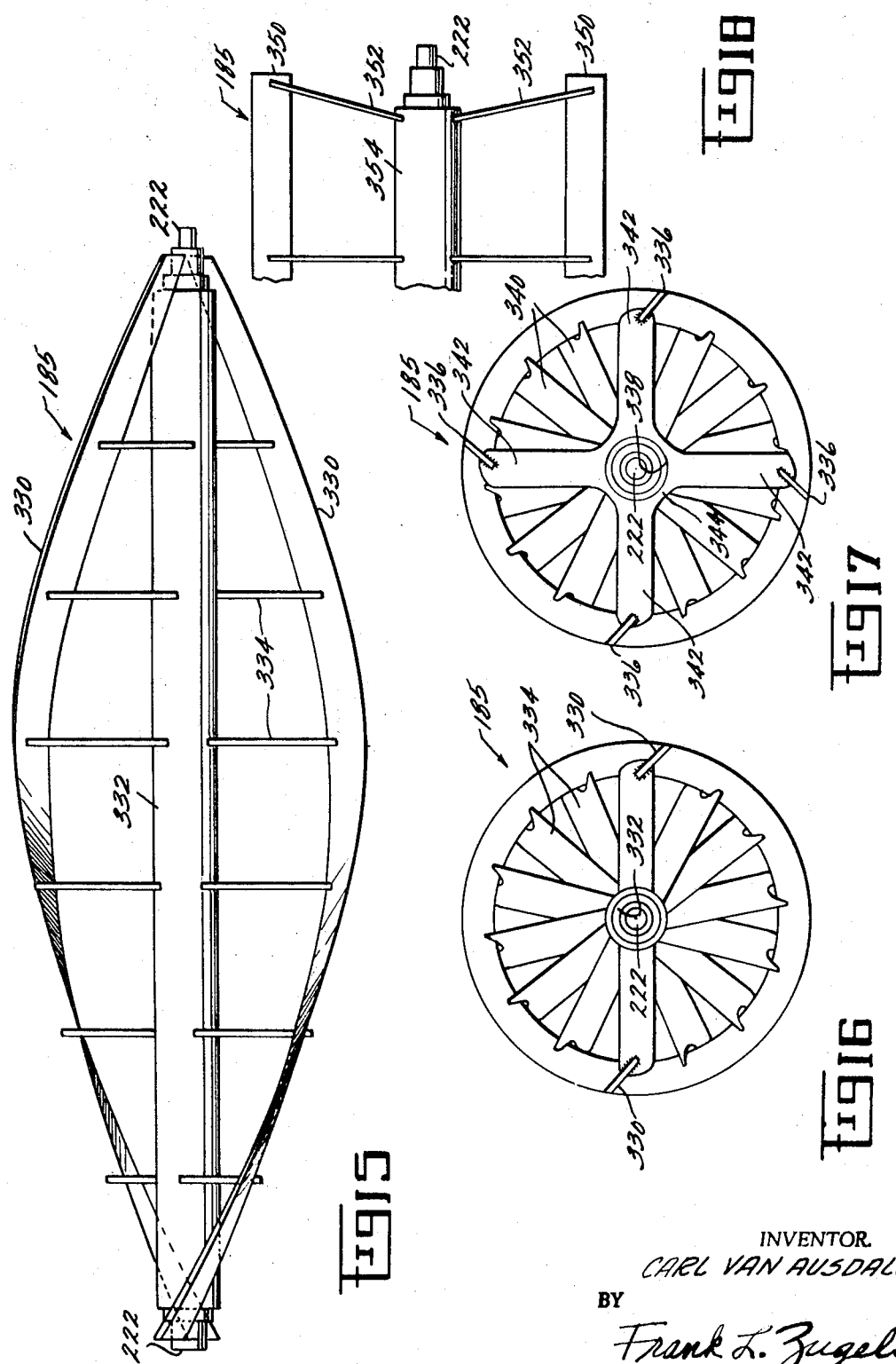

United States Patent Office 3,566,590
Patented Mar. 2, 1971

3,566,590
MACHINE FOR PROPELLING A WORK
IMPLEMENT
Carl Van Ausdall, Box 178, Bradenton, Fla. 33506
Original application Oct. 24, 1965, Ser. No. 504,792, now Patent No. 3,461,656, dated Aug. 19, 1969. Divided and this application Aug. 11, 1969, Ser. No. 848,908
Int. Cl. A01d 35/24
U.S. Cl. 56—26       6 Claims

ABSTRACT OF THE DISCLOSURE

A machine for propelling a work implement or the like, comprising a frame, an engine mounted thereon, a transmission for the engine, a three-point-to-ground suspension for the machine, the engine being disposed above an axle carrying a pair of tires, and a single rotatably mounted tire disposed rearwardly. A first power train connects together the transmission and axle for providing motive power to the machine. Steering means for the operator is connected to the rear tire. A pair of bracket means including trunnion mountings depends from a cross-bar forwardly of the machine, for supporting the work implement. A pair of levers is pivotally attached to the frame and to which the cross-bar is secured, for swivelling the work implement independently of movement of the machine, thereby providing for floating movement of the work implement. A second power train means is connected to a secondary power output shaft of the transmission, extending to a trunnion mounting in one of the bracket means and provides for actuation of the work implement.

---

This application is a divisional application of my co-pending application filed on Oct. 24, 1965, Ser. No. 504,792, and which issued on Aug. 19, 1969 as U.S. Letters Patent No. 3,461,656.

This invention relates to a lawnmower apparatus and subcombinations of elements therein, and in particular is related to a lawnmower machine in its entirety, a transmission adaptable for use in the machine and by which engine power is efficiently transmitted to a motive power drive shaft and ground wheels and to a reel mechanism, a combination of a transmission with an automatic clutch, a reel mechanism including novel bed plate knife and reel blade means therein, adjustable means for regulation of the reel blades and the bed knife means, and a swinging mechanism by which a proper amount of additional traction for the mower is obtained as a result of the added weight of the reel mechanism.

An object of this invention is to provide for a stable lawnmower machine that will not upset, one which can maneuver in close quaters, one which efficiently moves and climbs across steep terrain or grades, one which efficiently negotiates soft or uneven rough ground, and one that is readily operated by a simple movement of the foot.

Another object of this invention is to provide for a three-point-to-ground suspension for the machine whereby it evenly follows the contour of the ground.

Another object of this invention is to provide for a trunnion-type mounting for the reel mechanism whereby the ground is not scalped upon moving thereof.

Another object of this invention is to provide for a lawnmower machine customarily considered to be in the larger commercial class but which nevertheless is suitable for homeowner use.

Another object of this invention is to provide for a safety construction of a reel mechanism that eliminates the danger of ricocheting stones, sticks and the like, as well as preventing parts separated from the mower from doing likewise.

Another object of this invention is to provide for a lawnmower of the reel type that cuts down and cuts up tall and thick grasses on plots of ground not previously prepared by mowing.

Another object of this invention is to provide for a mowing combination of reel and knife that efficiently cuts grass and the like regardless of its rank or massiveness.

Another object of this invention is to provide for a lawnmower that includes a safety feature whereby the lodgement of anything between the knife bed and the reel blades causes cessation of travel of the lawnmower, and removal of such lodging may be obtained without danger while the engine remains running.

Another object of this invention is to provide for an efficient trunnion type mounting for a mower and other attachments.

Another object of this invention is to provide for a novel transmission adaptable for use in my lawnmower.

Another object of this invention is to provide for a combination of a spiral reel blade having an angle, preferably between 30° and 50°, to the plane of the ground at the point of contact with the bed plate knife and a bed plate knife whose leading or cutting edge is preformed at an angle to the plane of the ground so that the heel thereof cannot contact or push grass, weeds, or the like downwardly out of this path of the oncoming reel blade before the cutting edge thereof is contacted by the reel blade, and thereby result in an efficient cooperative relationship.

Another object of this invention is to provide for a mower having a reel and knife means that cut up what it cuts off.

Another object of this invention is to provide for a lawnmower that stops instantly upon removal of the operator's feet from the governor control pedal connected to the machine's engine.

Another object of this invention is to provide for additional and proper traction load for the ground tires by swinging the weight of the mower or reel mechanism on such tires.

Another object of this invention is to provide for a power take-off means operatively connected to the gearing of the transmission.

Another object of this invention is to provide for an effective connection between the power take-off means and reel blades or other attachments provided for the tractor or machine.

A still further object of this invention is to provide for a novel adjusting means for the efficient cooperation between the bed plate knife means and the real blades.

Another object of this invention is to provide for continuance of rotation of the reel blades even though the transmission is in neutral.

Another object of this invention is to provide for a novel tractor machine effectively suitable for mowing grass, removing snow, and other like tasks.

A further object of importance of this invention is to provide for a combination transmission and an automatic or centrifugal clutch whereby firm non-slipping engagement of clutch to a drum attached to a transmission shaft is effected only upon attainment of a certain amount of torque or r.p.m. of an engine drive shaft, such torque or r.p.m. being operable on the clutch at higher values for rotation of the engine drive shaft than at lower values thereof.

These and other objects and advantages will become apparent to those skilled in the art to which this invention pertains, upon a reading of the following description, appended claims therewith, and the drawing comprising six sheets of figures taken in conjunction with the description and claims, and in which drawing:

FIG. 1 is a front perspective view of my lawnowner apparatus embodying the hereinafter described invention;

FIG. 2 is a side perspective fragmentary view of mechanical linkage for steering the machine;

FIG. 3 is a sectional plan view taken from the underside of a novel transmission affording power to drive both the machine and a cutting reel and blades therefor;

FIG. 4 is an exploded view, partly in section and partially broken away, of a portion of the transmission illustrated in FIG. 3;

FIG. 5 is an end view of a clutch mechanism adaptable for the transmission illustrated in FIG. 3;

FIG. 6 is an elevational view, partially broken away, illustrating mechanical connections between manual motive means and the transmission of FIG. 3, by which various gearing of the latter are engaged and disengaged thereby;

FIG. 7 is a plan view, partially in section and partially broken away, of elements shown in FIG. 6;

FIG. 8 is an elevational view illustrating linkage between the transmission of FIG. 3 and the reel and cutting blades of the mower;

FIG. 9 is an elevational view illustrating lever mechanism and other means by which the reel and housing therefor is upwardly pivotable from a ground-engaging position;

FIG. 10 is a side elevational view, partly broken away, of the reel housing, illustrating a novel adjusting means for the mower's cutting elements;

FIG. 11 is a plan view of FIG. 10, partly in section and partially broken away;

FIG. 12 is a front view of a fragmentary portion of a bed plate member with knife means mounted thereon;

FIG. 13 is a side elevational view of the bed plate member with knife means mounted thereon;

FIG. 14 is a schematic diagram of a conventional bed plate knife shearing edge;

FIG. 15 is a longitudinal full view of a reel and cutting blade thereon;

FIG. 16 is an end view of FIG. 15;

FIG. 17 is an end view of a modified reel; and

FIG. 18 is a fragmentary full view of reel axle and blades and showing a modified construction at the ends thereof.

Referring now to the figures in which reference characters correspond to like characters in the following description, character 20 (FIG. 1) illustrates generally the lawnmower apparatus. Machine 20 includes a conventional piston-type engine 21 suitably fixed centrally of and at the front end of a frame 22 suitably mounted upon a set of three freely rotating rubber or balloon tires 24, the front two tires being spacedly mounted on a transversely disposed axle 25 (FIGS. 1, 8), and by which three tires mower 21 is displaced across ground. The fixing and mounting of engine to frame and axle to wheels may be effected in customary manner known in the power mower industry, however, it should be observed that engine 21 is vertically disposed centrally above axle 25 on which the two front tires 24 are rotatably mounted.

TRANSMISSION AND CLUTCH

Engine 21 is so oriented that its rotating crank shaft (not shown) extends longitudinally rearwardly of mower 20 whereby a clutch member 28 (FIG. 5) fixedly secured to such crankshaft is disposed in engageable position with a clutch drum 29 of an automatic transmission 30 housed at the rear of engine housing 31 (FIGS. 3, 8). Clutch member 28 is of the automatic type, such as the one disclosed in my patent for a centrifugal clutch, U.S. Pat. No. 2,696,282, issued Dec. 7, 1954. Clutch 28 is preferably mounted to the engine crankshaft in the manner disclosed in such patent.

Clutch drum 29 (FIG. 3) is provided with a central aperture 33 the surrounding defining portion of which is suitably secured to a clutch adaptor 34 slideably mounted onto a main drive (M.D.) gearing shaft 35. A Woodruff key 36 is provided between shaft 35 and adaptor 34 to prevent relative rotation between drum 29 and shaft 35. Both adaptor 34 and drum 29 are held axially stationary upon M.D. gearing shaft 35 between a shaft snap ring 37 engaging a well 38 received in adaptor 34 and a ball bearing housing 40 securely held in an opening 41 provided in a cast portion 42 projecting interiorly of metal transmission housing 30a. Two such ball bearing housings 40 are preferred, as shown in FIG. 3, each flush with and bearing against the other in opening 41, and held therein by a suitable pair of snap rings 43 mounted in annular grooves in ball bearing housings 40, and which rings 43 seat against the sides of peripheral recesses 44 formed in cast portion 42 about opening 41. Consequently, when clutch drum 29 is engaged by clutch 28 (FIG. 5), M.D. gearing shaft 35 rotates in the bearings contained in bearing housings 40, with the speed of rotation of the crankshaft of engine 21.

Integrally formed on the other end of M.D. gearing shaft 35 is a main drive (M.D.) gear 45 (FIGS. 3, 4) engaging other gears in transmission 30 to be described. M.D. gear 45 is preferably spaced from bearing housing 40 by means of a cylindrical shoulder 46 (FIG. 4). Formed as an integral part to shaft 35 is a driving clutch member 47 (FIGS. 3, 4) provided for transmitting to wheel axle 25 the engine speed of machine 20. A bore 48 is concentrically provided in member 47 and M.D. gear 45 for disposition of one end of a first power output (f.p.o.) shaft 49. A bushing 50 is mounted in bore 48 about shaft 49 to prevent friction between such shaft 49 and driving clutch member 47. A combination driven clutch and gear member 51 is slideably mounted on f.p.o. shaft 49 and is prevented from rotating about such shaft 49 by means of a square-shaped elongated key member 52 axially shiftlessly disposed in its peripheral surface and parallel to its axis. A lever shifting fork 53 (FIGS. 3, 6, 7) is slip-fittably coupled to a recessed central portion (FIGS. 3, 6) in combination member 51. Shifting of fork 53 to-and-fro along the axial length of shaft 49 provides for engagement and disengagement between driven and driving members 51 and 47. In engagement, f.p.o. shaft 49 rotates with the speed of rotation of M.D. gear shaft 35, and hereafter in this continuing description, such engagement is defined as high gear.

The specific structures of driven and driving members 51 and 47 and comprising various notches or dog teeth on said members that are interrelated with each other when both members engage or mesh with each other in gear, are generally known in the art, and a suitable combination thereof may be used to provide for unitary rotation of shafts 35, 49.

F.p.o. shaft 49 is supported at its other end in a pair of bearing housings 55, similar in nature to bearing housings 40, as it projects through the rear wall of transmission housing 30a (FIG. 3). A cover plate 57 is provided to cooperate with cast portion 58 for supporting such housings 55, and in addition, cover plate 57 seals off the interior of transmission 30. The free end of shaft 49 projecting through cover plate 57 is adapted for mounting a sprocket wheel 60 (shown in phantom in FIG. 3; FIG. 8) that is fixedly keyed at 61 on shaft 49. As shown in FIG. 8, a link chain 62 connects such wheel 60 and shaft 49 to a similar sprocket fixedly mounted on a power transmission (p.t.) shaft mounted in a housing 63 disposed below transmission 30 and engine housing 31. Housing 63 extends centrally of and longitudinally forwardly in an underslung position of apparatus 20 and is suitably connected to axle housing containing conventional differential axle elements (not shown) by which each front tire 24 is capable of rotating together or independently of the other front tire 24 in a customary manner. Thus, a power train connects transmission 30 with axle 25 for providing motive power for machine 20.

A second driven member or gear 65 is provided for a low gearing ratio between engine speed and ground speed of lawnmower 20. Gear 65 is slideably mounted on f.p.o. shaft 49 adjacent to but spaced from bearing housings 55, and is likewise keyed by key 52 to shaft 49. A second lever shifter fork 66 (FIGS. 3, 6, 7) is provided to slideably axially actuate driven gear member 65 along shaft 49 whereby a low gearing ratio between the crank shaft (not shown) of engine 21 and f.o.p. shaft 49 can be effected. Shifter fork 66 is cooperatively received about a reduced central portion of collar 67 integrally formed with gear member 65, whereby the latter is capable of being slideable on shaft 49.

As driven member 65 is axially displaced forwardly along shaft 49 by means of fork 66, its teeth engage an idler cluster gear 70 rotatably mounted upon a cluster gear shaft 71 spacedly positioned from but provided on center with and parallel to f.o.p. shaft 49, (FIGS. 3, 6). Cluster gear shaft 71 is pinned against rotation, as at 72, in cast 58 of transmission housing 30a that supports it. Idler cluster gear 70 is formed integrally upon one end of a sleeve 73 freely rotatable upon cluster gear shaft 71. At the other end of sleeve 73, an idler gear 74 is integrally formed and positioned to continuously mesh with main drive gear 45. A pair of bushings 75, 76 is provided for frictionless rotation of sleeve 73 on cluster gear shaft 71, and a pair of cluster gear spacers 78, 79 is mounted on cluster gear shaft 71 each at an opposite end of sleeve 73, adjacent bushings 75, 76, respectively, and contiguous to cast portions 58, 42, respectively, of transmission housing 30a, in order to provide for proper spacing and cooperative association of idler gears 70 and 74 with gears 65 and 45, respectively.

Consequently, to effect a low gearing for forward mottion of lawnmower 20, shifter fork 66 is axially advanced forwardly along f.o.p. shaft 49 so that gear 65 meshes with idler cluster gear 70 with which idler gear 74 continuously rotates. Idler gear 74, of course, rotates whenever M.D. gear 45 rotates. Hereafter in this continuing description, such low gearing will be described as low gear.

It should be noted that combination member 51 and members 65, 67, although freely axially slideable on f.o.p. shaft 49, are nevertheless limited to specific axial movements dictated by the limits of axial movement of their respective lever shifter forks 53, 66 that respectively cooperate with them.

Reverse or rearward motion of machine 20 is provided by cooperative action of shifter fork 53, M.D. gear 45, idler cluster gears 74, 70 and a sliding gear 80 included in combination member 50 on f.o.p. shaft 49, and a series of gears mounted on a reversing shaft 81 provided off-center to and in spaced parallel relationship to shafts 49 and 71, preferably disposed below shafts 49, 71 as shown in FIG. 6. The ends of reversing shaft 81 are mounted in cast portions of transmission housing 30a, it being pinned (not shown) to cast 58. A collar 82 is mounted and pinned (not shown) to shaft 81 to prevent axial movement and maintain alignment of an idler gear 83 mounted on a bushing (not shown) on reversing shaft 81. Idler gear 83 rotates as a consequence of continuously meshing with idler cluster gear 70 on sleeve 73 (FIGS. 3, 6) rotating about cluster gear shaft 71. Reverse idler gear 83 meshes with sliding gear 80 on f.o.p. shaft 49 upon the latter's axial actuation by shifter fork 53. Sliding gear 80 meshes therewith by rearward axial movement of combination member 51 on f.o.p. shaft 49. Such meshing effects an opposite rotation of f.o.p. shaft 49 to that of M.D. gear shaft 35 and the crankshaft of engine 21 of the lawnmower. Consequently, the mechanical power transmitted through axle 25 to tires 24 is reversed in direction and mobile machine 20 moves rearwardly. Hereafter in this continuing description, such reverse gearing will be described as reverse.

Each of shifter lever forks 53, 66 is supported (FIG. 7) on one of a pair of spaced parallel arms 86, 87 respectively, that is slideable in bores 88a, 88b, and 89a, 89b, respectively. Such bores are horizontally drilled in a preferably upper half casting 90 (FIGS. 6, 7) vertically disposed above and suitably secured to the lower half of transmission housing 30a by threaded bolts 91 the crosssections of which are shown in FIG. 3. Shifter fork 53 comprises a cylindrical hollow sleeve 92 (FIG. 7) pinned to arm 86, as at 93, and having a pair of depending spaced tines 94 (FIG. 6) that cooperate with combination member 51, as previously described. Included in sleeve 92 is an axially-disposed circumferential recess 95 (FIG. 7) into which an end 96 (FIG. 6) of a manually-operable pivotal lever 97 is receivable. Recess 95 is disposed along the length of arm 86 in a manner that is in direct opposite confrontation to a like recess 98 included in arm 87 upon which shifter fork 66 is mounted. Shifter fork 66 comprises a cylindrical hollow sleeve 99 pinned to arm 87, as at 100 in FIG. 7, and having a pair of spaced depending tines 101 integrally formed therewith and depending therefrom to cooperate with driven clutch member 65, as previously described.

End 96 of lever 97 is juxtapositioned between recesses 95, 98 for cooperative action with each of arms 86, 87 as will be hereinafter described.

Each arm 86, 87 is slidable in its respective supporting bores 88a, 88b and 89a, 89b (FIG. 7) disposed in casting 90 so that shifter forks 53, 66 axially displace along f.o.p. shaft 49 and thereby actuate the gearing mechanisms heretofore described. All of such supporting bores are sufficiently deep to provide for the space necessary for reciprocation of arms 86, 87 during gearing changes effected by actuation of transmission 30.

In order to ensure the gear meshing desired by their respective shifter forks 53, 66, a detent means 105 (FIG. 7) is provided to cooperate with each of arms 86, 87. By such cooperation each arm 86, 87 is reciprocated a predetermined distance to accomplish the aforesaid described gearing ratios in low, high and reverse gears. For arms 86, detent means 105 comprises a detent ball 105a biased by a compressed spring 105b. Elements 105a, 105b are seated in a bore 108 disposed in casting 90 and perpendicularly bisecting supporting bores 88a, 89a. Similarly for arm 87, detent means 105 comprises a detent ball 105c biased by a compressed spring 105d with both such elements also seated in bore 108 in the same manner as elements 105a, 105b.

Each of arms 86, 87 includes a series of notches or grooves that engage a detent means 105 to axially position the arm, and consequently, shifter forks 53, 66 into high or low gears, and reverse gear, respectively. Arm 86 is provided with an annular groove 110 that its corresponding detent means 105a, 105b engages to maintain shifter fork 53 in neutral position (transmission out of gear, i.e.). Likewise, arm 87 is provided with an annular groove 111 that its corresponding detent means 105c, 105d engages to maintain shifter fork 66 in neutral position. The gearing of transmission 30 is in neither of the two forward gears or in reverse gear.

It may be noted here (FIG. 7) that recesses 95, 98 in sleeve 92 and arm 87, respectively, directly confront each other when transmission 30 is in neutral, and that it is end 96 of lever 97 that projects downwardly to be juxtapositioned between such recesses that causes reciprocation of one or the other of arms 86, 87. It is this confronting positioning of recesses 95, 98 that places transmission 30 in a neutral position, with no power being transmitted to axle 25 of machine 20 from the crankshaft of engine 21.

Pivoting of lever 97 places the transmission gearing into one of three positions from neutral position; forward gear, reverse gear, or lower gear; each of such gearing correspondingly propels apparatus 20 forwardly at a high speed, rearwardly, or forwardly at a relatively low speed.

The pivoting of lever 97 requisite to axially displace either one of shifter forks 53, 66 is provided as follows. Mounted along the length of lever 97 is a spherical element or ball 115 (FIG. 6). Ball 115 is disposed within a hollow cone cast portion 116 of the upper transmission housing half 90, such portion 116 being generally aligned with the length of lever 97. Spherical element 115 is biased upwardly against an opening 117 in the apex of such portion 116 by means of a lever supporting conical helical spring 118 under compression. Spring 118 is seated upon a plurality of angular projections or lips 119 situated near the base of cone portion 116, and has its smaller helical end engaging spherical element 115. Spherical element 115 is provided with a diametrical bore that is adapted to register with a like bore in lever 97. These bores seat a levelly aligned pin 120 that maintains the proper disposition of lever 97, more particularly its end 96, in relation to arms 86, 87. Also formed in ball 115 is a vertically aligned slot 125 in which a headed rivet 127 is disposed. The end 128 of rivet 127 is seated in a hole in cone casting 116 so that lever 97 and its end 96 does not rotate about its axis whereby end 96 would not consistently properly engage recesses 95, 98 in all instances of use.

Thus, it should now be apparent that by manipulating lever 97 manually by its knob 126, lever end 96 cooperatively engages either recess 95, 98 to the exclusion of the other so that only the arm 86 or 87 corresponding to its engaged recess 95 or 98 is reciprocated. However, the juxtaposition of lever end 96 between recesses 95, 98 provides for physical possibility of mutually engaging cooperation with both recesses 95, 98.

To ensure exclusionary reciprocation of one arm to the other, means are provided in bore 108 to prevent either of such arms 86, 87 from reciprocating while the other is reciprocating. As shown in FIG. 7 a locking pin or detent 130 is slidably seated in the portion of the bore 108 disposed between arms 86, 87. Its total length is slightly greater than the shortest distance between bores 88a and 89a. Each of the rounded ends of detent 130 is adapted to engage one or the other of correspondingly rounded annular grooves 110, 111 in arms 86, 97 respectively. Reciprocation by lever end 96 of one or the other of arms 86, 87 from out of its neutral position causes detent 130 to move into cooperative engagement with the annular groove of the other arm thereby preventing such latter arm to reciprocate. Therefore, no damage is possible to the gearing mechanism of transmission 30 by manipulation of lever 97.

The extent of reciprocation of either arm 86, 87 is limited by cooperative action of detent notches defined in each arm and its corresponding detent means 105. As each arm 86 or 87 is reciprocated from out of its neutral position by means of its corresponding shifter fork, another position therefor is established by the locking of a detent notch with one of detent means 105. Notch 132 is defined in arm 86 on one side of annular groove 110 and notch 133 is defined in arm 86 on the other side of annular groove 110. Groove 134 is defined in arm 87 as shown in FIG. 7. The spacing apart of each of detent notches 132, 133 and 134 from their corresponding annular grooves 110, 111 on their respective arms 86, 87 is correlated to the particular gearing (high, reverse, or low) to be accomplished in transmission 30. The spacing of detent notch 132 from annular groove 110 is correlated to the movement of shifter fork 53 from neutral position to a position at which driving member 47 and driven member 51 are engaged (high gear). The spacing of detent notch 133 from annular groove 110 is correlated to the movement of shifter fork 53 in an opposite direction for proper meshing of gear 80 with reversing gear 83 (reverse gear). And the spacing of detent notch 134 from annular groove 111 is correlated to the movement of shifter fork 66 from neutral position to a position at which member 67 has sufficiently advanced for proper meshing of gearing 65 with cluster gear 70 (low gear).

POWER FOR REEL

Transmission 30 also includes an efficient gearing mechanism to rotate lawnmower reel blades from the engine speed in any of the forward, stopped, or rearward motions of the apparatus 20.

As shown in FIGS. 3, 6, a second power output (s.p.o.) means 140 is provided in cooperative relationship with M.D. gearing shaft means 35. Means 140 comprises a take-off gear 142 freely rotatably mounted on a s.p.o. shaft 143 journaled in a pair of spaced suitable bearings 145, 146, a driven member 148 securely fixed to shaft 143 and adapted for engagement with a driving member 150 integrally formed with gear 142, a pair of bevel gears 151, 152, the one gear 151 being mounted upon and keyed as at 154 with shaft 143, the other bevel gear 152 in meshing arrangement at 90° with bevel gear 151, and a journaled driving shaft 155 adapted for connection to a reel mechanism for machine 20. Driving shaft 155 is preferably integrally formed, or is otherwise suitably coupled, to bevel gear 152.

Take-off gear 142 is in continuous mesh with M.D. gear 45, thereby continually rotating when engine 21 is operating and automatic clutch 28 is engaged with drum 29. Gear 142 is free of frictional and fixed engagement with shaft 143 by means of a cylindrical bushing (not shown) separating them, and which bushing also effectively serves to free second driving member 150 also from shaft 143. The second driven member 148, keyed as at 157 to shaft 143 for unitary rotation therewith, is nevertheless axially displaceable along shaft 143 for engagement with driving member 150 by means of a shifter fork 159.

Shifter fork 159 is similar in make to shifter fork 66 and comprises a cylindrical hollow sleeve 160 having a pair of space tines 161 depending therefrom (FIGS. 7, 6). Slevee 160 fits a reciprocable arm 162 on center line with, displaced from, and parallel to the axes of arms 86, 87 (FIG. 6), and is pinned thereon as at 164 in FIG. 7. The depending pair of tines 161 embraces a reduced central portion of driven member 148 so that the latter axially displaces along shaft 143 upon reciprocation of arm 162. Arm 162 is supported in bores 166a, 166b disposed in cast portion 90 of transmission housing 30a, such bores being sufficiently deep to provide space for reciprocation thereof. As shifter fork 159 is actuated, driven member 148 engages or disengages from driving member 150, as the case may be, thereby locking or unlocking such members. Driving and driven members 150, 148 are similar in nature to members 51, 47, and are well known in the art.

To actuate shifter fork 159, arm 162 is reciprocated by means of a second lever 168 pivotable about a fulcrum in a second hollow cone cast portion 169 of the transmission housing upper half 90. Cone portion 169 is preferably in parallel relationship to cone portion 116. Such fulcrum comprises a rod 170 horizontally supported in cone casting 169 as shown in FIG. 6. Rod 170 extends diametrically through lever 168 in a level manner and perpendicularly to the axis of arm 162. A tang (not shown) is integrally formed at the base of lever 168 and is accommodated in a peripheral groove 171 (FIG. 7) of arm 162, thereby providing for the connection by which arm 162 is reciprocated by pivotal movement of lever 168.

The extent of reciprocation of arm 162 is controlled by a detent means 173 (FIG. 6) that registers in one or the other of a pair of detent notches 174 (FIGS. 6, 7) provided in arm 162 (FIGS. 6, 7). Detent means 173 is disposed in a hole or bore drilled in cast portion 90, and comprises a ball and spring that function in a similar manner to that of detent means 105 used in connection with arms 86, 87. The ball of detent means 173 is biased in one or the other of detent notches 174 formed in arm 162. Consequently, as shifter fork 159 axially moves as a result of lever 168 pivoting about its fulcrum 170, detent means 173 cooperates with one or the other of detent notches 174 thereby controlling the positioning of arm 162. The spacing between the two notches 174 on arm 162 is correlated to the distance required for movement of driven member 148 axially along shaft 143 to properly and fully engage and disengage driving member 150.

A cylindrical spacer 176 (FIG. 3) is mounted about shaft 143 between a washer 177 adjacent bearing 145 and bevel gear 151. Further, a washer 178 separates bevel gear 151 from driving gear 142. A bushing (not shown) is mounted in gear 142 and adapted to engage a shoulder (not shown) on shaft 143 to prevent axial movement of gear 142. Thus, driving gear 142 is maintained in proper alignment and meshing engagement with M.D. shaft gear 45. Spacer 176 also functions to maintain proper relative positioning of bevel gear 151 to its co-acting bevel gear 152.

The mounting of these parts as shown provides for the facile registration of one or the other of detent grooves 174 in arm 162 with detent means 173, and thereby avoids unalignment of the heretofore described elements of s.p.o. means 140 that could otherwise make unworkable transmission 30 or damage same.

With driven member 148 locked onto driving member 150, meshing bevel gears 151, 152 rotate, with the consequent rotation of power take-off shaft 155. Shaft 155 is journaled in a pair of suitable bearings 180, 181 (FIG. 3) housed in an outlet tubing 182, preferably horizontally disposed, provided in transmission housing 30a. It should be observed from FIGS. 6 and 3 that an advantage of a plurality of dispositions for tubing 182 arises, relative to bevel gear 151. For example, tubing 182 and bevel gear 152 may be swung through an angle θ or any fractionable degree thereof so that power take-off shaft 155 may be directed as desired. In FIG. 6, phantom lines 182a represent any one of such plurality of positions for shaft 155, for it is clear from FIG. 6 that bevel gear 152 may be readily swung about bevel gear 151 and still remain in cooperative relationship therewith.

It should now be apparent that apparatus 20 may be propelled without power being transmitted to its reel mechanism, simply by not actuating lever 168 whereby members 148, 150 would engage and lock. Furthermore, power to the reel mechanism can be transmitted to the reel and cutting blades thereof independently of motion or non-motion of machine 20, as a result of power being transmitted to s.p.o. means 140 separate and apart from power transmitted to f.p.o. shaft 49.

LINKAGE MECHANISM BETWEEN TRANSMISSION AND REEL

FIG. 8 illustrates linkage mechanism or power train 183 by which power to take-off shaft 155 is transmitted to a reel mechanism 185 mounted on apparatus 20. A first link chain 186 is mounted upon a pair of sprocket wheels 187, 188, wheel 187 (FIGS. 8, 3) being fixedly mounted to s.p.o. shaft 155 and wheel 188 being disposed directly forward of wheel 187 and bearingly mounted at the inner end of a laterally disposed axle housing 190 whose inner end is secured to the side of engine housing 31. The inner end of axle housing 190 may also be fastened to an angle-iron element or the like constituting part of frame 22. A second link chain 192 is mounted upon a second set of sprocket wheels 194, 195, wheel 194 being bearingly mounted adjacent the outer end of laterally disposed axle housing 190 and wheel 195 being bearingly mounted adjacent the inner end of a second laterally disposed axle housing 197. Axle housing 197 is disposed forwardly and preferably at an elevated height with respect to axle housing 190, and is secured to a crossbar 364 (FIGS. 1, 9) securely fastened, as at 366 in FIGS. 1, 9, to respective triangular elements 200a, 200b, of a pair of bracket members 200 the lower ends of which are swivelly supported exteriorly to a reel housing 202. A third link chain 206 is rotatably coupled about a third set of sprocket wheels 208, 209, wheel 208 being bearingly mounted on the outer end of housing 197 and freely projecting through one element 200 (FIG. 1) and wheel 209 being fixedly mounted on an extension 222 of a reel axle of reel mechanism 185. It should be understood from FIG. 8 that each link chain 186, 192, 206 is longitudinally arranged with respect to the length of machine 20, and are generally parallel with each other.

It should now be apparent that the rotation of s.p.o. sprocket wheels and chains just described so that power shaft 155 provides for actuation of the variously linked directly from the engine speed proper is transmitted to reel mechanism 185. Various speeds of rotation of the cutting reel blades in reel mechanism 185 may be obtained by varying the ratios of the described sprockets. Also, low gear does not prevent effective mowing and cutting up of tall and thick grass, since the speed of the reel blades is consistent with the engine speed directly off of shaft 35 although the ground speed of machine 20 is small in view of low gear.

HOUSING

As shown in FIGS. 1, 9, 10 and 11, a reel housing 202 includes a cast or molded pair of vertical walls 227, 228 securely connected together such as by bolts through a rigid angle iron 229 edged laterally along the forward terminus of a top wall 230 extending transversely across the width of the reel and generally of machine 20 (FIG. 1) and by bolts 232 through top wall 230 adjacent the rear walls 227, 228. Each vertical wall 227, 228 is provided with an elevated forwardly projecting extension 234, 236 respectively, for mounting of a ground caster wheel 238 therebelow and adapted to freely rotate to any degree or direction as it progresses revolvingly across ground as machine 20 is propelled. Each caster wheel 238 is suitably rotatably mounted in a forked member 240 having a rod 242 integrally formed at its apex and disposed and bearingly mounted in a sleeve 244, 246 correspondingly formed of extensions 234, 236, as shown in FIGS. 1, 10.

Caster wheels 238 are adapted to cooperate with a ground roller 250 (FIGS. 10, 11) transversely disposed at the rear and bottom of housing 202 and which is adapted to maintain contact with ground surface. Ground roller 250 cooperates with caster wheels 238 to maintain support of reel housing 223.

Ground roller 250 is rotatably mounted between a pair of vertically disposed elongated bracket members 252 the height of each of which being adjustably secured to an exterior surface of each of the vertical walls 227, 228 adjacent their respective rear terminus edges. Cast or molded in each of walls 227, 228 is a pair of spaced vertically aligned flanges 254 between which a bar bracket 252 is disposed. Each bracket 252 includes a series of apertures any one of which is adapted to register with one of a plurality of holes in its corresponding wall 227, 228, whereby a threaded bolt or bolts 255 secure bracket 252 and roller 250 to housing 202. Such registration and securing together by bolts 255 provide an adjustability for the height of roller 250 whereby housing 202 is adjustably lowered or raised in relation to the ground contact made by caster wheels 238. Consequently, the plane of cutting grass and the like by means of the cooperative action between reel blades and bed plate knife means hereinafter described, is adjustable in height over the ground surface, thereby obtaining a desired cutting height for grass or the like.

A preferred bearing means 260 for each end of ground roller 250, whereby efficient lubrication and revolution of roller 250 across ground is achieved and maintained, is shown in FIG. 11. A nipple 261 is provided at the egress point of a conduit 263 in a bearing support 264 whereby lubrication is effected and thrust into spaces provided on each side of bearings 266 mounted in bearing housing 267. A radially extending conduit 268 carries lubrication to space 269 on one side of bearings 266 and conduit 263 carries lubrication to space 271 on the other side of bearings 266 through the center of the bearings. Nipple 261 conveniently projects out of each bracket 252 for lubrication purposes.

BED PLATE KNIFE MEANS—STRUCTURE

A bed plate knife means 275 (FIG. 10) that cooperates with rotating blades of reel mechanism 185 is mounted transversely across the bottom of reel housing 202. Means 275 comprises a molded or cast, generally elongated, member 276 having an upwardly facing curved surface 277 across which cut grass is swept up along a rear wall (not shown) of housing 202 and over roller 250, and a knife means 279 including a shearing lip or edge 280. Curved surface 277 extends across the interior width of reel housing 223.

Knife means 279 is formed from a suitably tempered metal member riveted co-extensively along and to the flat bottom of the portion of member 276 constituting the base of curved surface 277, as at 282 shown in FIGS. 12, 13.

Knife means 279 comprises a shearing element edge or lip 280 that preferably includes a material thickness 280$t$ to rely upon for sharpening purposes in addition to providing for a shearing surface. Lip 280 projects upwardly and at an angle with respect to the plane of the ground or the riveted portion of member 279. A relief 280$r$ is formed in the heel of lip 280 below the shearing surface or plane of action thereof. Consequently, the shearing or cutting edge of lip 280 leads as knife means 279 advances across ground. It is important to note here the advantage obtained by such relief 280$r$ preformed in knife means 279. FIG. 14 shows a cross-sectional elevation of a standard or conventional bed plate knife means 285 comprising a vertically aligned edge 285$e$ having no relief in its heel 285$h$. Consequently, as standard bed plate knife means 285 is thrust forwardly across ground, grass stalks and the like are shoved forwardly and downwardly by heel 285$h$, out of the path of an oncoming revolving reel blade, instead of remaining upright or in their otherwise natural growing state for cutting off at a uniform level at the plane of shearing that occurs at 285$s$. What occurs is the sweeping or shoving of uncut grass along the length of edge 285$e$ by heel 285$h$ at the same instant of cooperation between knife and reel cutting blade instead of a reel blade cutting such grass that is engaged by the knife at the instant of cooperation between blade and knife (at 285$s$). A relatively choppy, uneven or way cut grass apron or area is achieved with use of such a standard knife means 285, whereas my knife means 279 does not brush or sweep aside grass prior to or at the instant of contact between the reel blade and the shearing plane at lip 280. It provides for an immediate and more uniform cutting, an unexpected result by the inclusion of a preformed bed plate knife having a relieved heel 280$r$.

BED PLATE KNIFE MEANS—MOUNTING

Each of the lateral ends of bed plate member 276 is provided with a horizontally disposed flat extension 290 one of which is shown in FIGS. 10, 11, and 12. Extensions 290 respectively extend to the outside of each of their corresponding vertical walls 227, 228 of housing 223. Each flat extension 290 is provided with a pair of spaced threaded holes 292 vertically aligned therein and registrable with a pair of hollow bores 294 included in a novel bracket member 295 (shown in FIGS. 10 and 11) adapted to be attached to a corresponding vertical wall 227, 228. A threaded bolt 296 is inserted in each bore 294 over a washer 297 seated on the top of each bore 294 and is threaded tightly to corresponding threaded holes 292 in the flat extension 290.

ADJUSTABILITY OF BRACKET MEMBER AND BED PLATE KNIFE MEANS

Each of bracket members 295 mounted to its respective vertical wall 227, 228 comprises an element adapted to pivot at its rear end portion 310, at which a fulcrum is formed by means of a bolt 312 thorugh such end portion 310, the bolt 312 retaining member 295 to its respective wall 227, 228, and having a second end 314 disposed forwardly of bores 294. An elognated slot 316 is defined in end portion 314 in a generally vertical manner so that it reciprocates upon a stationary bolt 318 threaded into its associated wall 227, 228. By loosening bolts 312 and 318 that extend through member 295 and into each wall 227, 228, member 295 is pivotable about bolt 312 to the extent of the length of slot 316. Consequently, bed plate knife means 275 that is secured to bracket member 295 is displaceable away from or towards the reel blades of reel mechanism 185.

Means are provided for adjusting and controlling the spacial relationship between bed plate knife means 275 and the reel blades in order to maintain efficient shearing action and to utilize the thickness of material 280$t$, and for controlling the extent of pivotal movement of bracket means 275. Disposed along the length of each means 275 intermediate of the pair of bores 294 and slot 316 is a portion including a vertically aligned screw threaded bore 320 adapted to be disposed over a lug portion 322 laterally engaging a corresponding wall 227, 228. Each lug 322 is preferably cast in each wall 227, 228. A threaded screw 324 is seated in bore 320 with its free end registering upon a lug 322. Rotation of the pair of bolts 324 one way or the other against the threads of bore 320, after loosening of bolts 312 and 318 and a lock nut 326 for each bolt 324, arcuately raises or lowers bed plate knife means 275, and consequently shearing edge 280, as a result of the pivotal action of bracket members 295 that fixedly carry flat extensions 290. It is clear from the illustrated figures that the arc of knife means 275 crosses the arc of rotation of the reel blades as lawn mower 20 advances across ground.

REEL AND BLADES THEREON

As illustrated by FIGS. 15–18, reel mechanism 185 is provided with a plurality of rotating cutting blades 330 connected to an axle 332 bearingly mounted as at 331 (FIG. 11) to vertical side walls 227, 228. The embodiment of the invention contemplates two forms of mode of operation for reel blades. As shown in FIGS. 15, 16, a pair of uniformly opposed blades 330 are helically wound, each through an angle of 180°, about the length of axle 332 and within the confines of walls 227, 228. These blades 330 are spaced from axle 332 a proper radial distance in order to effectuate an efficient shearing action with bed plate knife means 275 heretofore described. Such spacing is provided by spokes 334 perpendicularly disposed to axle 332, pairs of which oppose each other on opposite sides of axle 332. A plurality of such pairs of spokes 334 are angularly oriented about reel axle 332 in order to provide for the helical configuration for each blade 330. A strong weld between axle 332 and each spoke 334, and each spoke 334 with its associated blade 330, is preferably sought in connecting such elements together.

FIG. 17 illustrates the use of a four-bladed reel having four cutting blades 336 uniformly helically or spirally wound about an axle 338. Each blade 336 is also helically wound through 180° about the length of axle 338 and within the confines of walls 227, 228. Each blade 336 is spacedly supported from axle 338 by a plurality of spaced angularly oriented spider members 340 each of which incorporates four spokes 342 one for each blade 336. Each spider member 340 includes a hub portion 344 about a central orifice into which axle 338 is received, and, of course, welding of axle to spider and spider to blade is the preferred manner of securing these connections together.

It should be understood that FIG. 17 should not be interpreted as showing that each blade 336 spirals through only 90°. Viewing blades 336 of FIG. 17 in a clockwise manner, each blade winds spirally behind each successive blade 336 that is phased at its first end 90° in advance of the first end of the preceeding spirally wound blade 336 in FIG. 17, such that the spiral winding of each blade 336 after uniformly winding throughout its length effects a 180° angle at its last end.

FIG. 18 illustrates a modification of a spoke or spider connection for the blades and axle of reel mechanism 185. It is preferred that the lateral ends 350 of each of the blades are immediately juxtapositioned to the interior face of its corresponding vertical wall 227, 228, to achieve as wide a path of cutting as possible. Spokes or spider members 352 that are adjacent ends 350 are slanted inwardly therefrom to be secured to an axle 354, in order to provide for sufficient length of axle 354 at its respective ends to be suitably mounted on its journalled bearings that are contained generally within the thickness of walls 227, 228.

Only one point of cooperative action at any instance in time is realized between shearing edge 280 and the reel blades 330 exemplified in FIGS. 15, 16, and at any instance of time for shearing edge 280 and the reel blades 336 exemplified in FIG. 17, only two points of such cooperation are realized. In the latter case, the first point of cooperation lies on a first blade 336 that is rotating into knife means 275, and the second such point is to be found on the immediately following rotating blade 336 that is phased 90° behind the first blade 336. The advantage in this design of blades maintains a constant pull on the sprocket chains that transmit power from transmission 30 to axles 332, 338, and thereby eliminates vibration that would otherwise develop in such axles and be transmitted in return to the sprocket chains. An irregular pulling effect on such chains is otherwise set-up were three or five bladed reels introduced for cooperative action with bed plate knife means 275, with consequent damaging effects occuring as a result of uncontrollable vibration.

As shown in FIG. 10, at the point of cooperative relationship between each blade 336 (or 330) secured to its spiders or spokes and the shearing surface of lip 280 of bed plate knife means 275, the mounting of each such blade as it spirally winds on its reel provides for the plane of the reel blade to form an angle relative to the ground as it sweeps over lip 280 and sweeps through with rotation of its reel. This angle lies preferably between 30° and 50° the spread of which includes the most effective cutting angle for each blade 336 (330) as it co-acts with upwardly projecting lip or edge 280.

SWINGING MECHANISM FOR TRACTION AND FOR AVERSION OF DAMAGE TO REEL MECHANISM

FIGS. 9 and 1 illustrate apparatus by which additional traction is obtained in optionally varying degrees for machine 20. In use over rough or muddy terrain, additional traction may be required or is otherwise desirable. Its purpose also includes aversion of loose objects, or grounded obstacles, or the like that could damage reel mechanism 185. Means 360 is provided for reel mechanism 185 and its housing 202 whereby same are wholly lifted in a swinging fashion upwardly from ground engagement. The combined weights of mechanism 185, housing 202, and of the operator of vehicle 20 by his efforts to swing such mechanisms are advantageously utilized to gain advantageous traction on front tires 24.

Means 360 is generally pivotally mounted on frame 22 and extends forwardly of engine housing 21, and is actuable by the operator of the vehicle while sitting at 442 (FIG. 1). Each of a pair of raising levers 361 are pivotally attached at its rear end to a longitudinal frame member 22 located below and to each side of engine housing 21. The other ends of each of raising levers 361 are secured, as by welding, to a cross-bar 364 levelly traversing machine 20 between engine housing 21 and reel housing 202. Each of the pair of connecting molded elongated bracket members 200 include a triangularly shaped portion 200a, 200b that is suitably and securely mounted or fastened, such as at 366 shown in FIGS. 1, 9, to a corresponding end or flat bracket member 365 of cross-bar 364. Bracket members 200 are disposed in parallel spaced relationship with each other and both slant downwardly and forwardly along the exterior faces of vertical walls 227, 228 to support such walls on circular steel inserts 368 (one of which is shown in FIG. 11) integrally mounted in members 200. Each bearing 331 (FIG. 11) which carries the reel axle is mounted in its corresponding steel insert 368 so that the mower itself, with housing 202, floats in members 200, and the reel rotates in the bearings as a result of power transmitted through sprocket wheel 209 fixedly mounted to reel axle extension 222. A trunnion mounting is thereby effected for reel mechanism 185.

As illustrated by phantom lines in FIG. 9, as raising levers 361 are pivotally elevated, cross-bar 364 is likewise elevated, and depending bracket members 200 swivel upwardly thereby lifting housing 200 and reel mechanism 185.

Linkage means 372 is provided whereby levers 361 are pivoted upwardly to elevate reel mechanism 185 and housing 202 and thereby throw weight upon the wheel axle 25 and tires 24 supporting same.

Linkage means 372 comprises an actuatable bar 374 to one end of which a ball-crank member 376 is pivotably attached. The apex of ball-crank member 376 is pivotally attached to frame member 22 that is disposed below levers 361. Leg 378 of ball-crank member 376 extends forwardly of frame member 22. At its forward end, a connecting rod 380 connects ball-crank member 376 to the one lever 361 on the left side of machine 20 as viewed in FIG. 9.

The rear end of actuatable bar 374 is attached to a manually-operable lever means 382 that is readily available to the operator of vehicle 20. Lever means 382 comprises a hub 384 to which bar 374 is pivotally attached, a hand grasping lever 386 extending upwardly from hub 384 and a pivotable link 388 fixed to hub 384 and extending down to frame member 22 and pivotally attached thereto.

It will be observed from the phantom skeleton shown of the apparatus in FIG. 9 that the rearward motion of lever 386 causes actuatable bar 374 to linearly react rearwardly. As a result, ball-crank member 376 rotates at its apex pivotally mounted on frame member 22 thereby lifting its leg 378 and connecting link 380. This in turn pivots both supporting levers 361 and raises cross-bar 364 upwardly. Consequently, the entire reel mechanism 185 and housing 202 are swung up off the ground.

A spring means 390 cooperating with bar 374 through any one of a series of apertures 392 in hub 384 is provided to resiliently control the amount of weight that housing 202 and reel mechanism 185 apply against ground. As shown in FIG. 9, spring means comprises a spring 393 attached to a portion of frame 22 on superstructure 406 (FIG. 1) at its rear end, and is connected at its front end to hub 384 preferably via connecting link 394. The resilient control is varied by attaching bar 374 to anyone of the series of apertures 392 in hub 384. By connecting bar 374 to an aperture 392 that is linearly closer to frame member 22 as viewed in FIG. 9, the resiliency of spring 393 relieves to a greater degree the weights of housing 202 and reel mechanism 185 upon grass or ground.

STEERING

Means for steering machine 20 is efficiently and effectively realized by structure illustrated in FIG. 2. A steering column 401, to which a steering wheel 402 is mounted in a customary way, is suitably mounted to a casing 404 (FIG. 1) of superstructure 406 and is connected to a vertically aligned rod 408, suitably supported (not shown) on horizontally aligned spaced frame elements 410 welded to frame 22, through a universal element 412, in a customary manner. A pinion gear 414 transmits the rotation of steering wheel 402 to a spur gear 416 mounted at one end of a second rod 418. At the other end of second rod 418, a pinion gear 420 is fixedly mounted and which meshes with a spur gear 422 fixedly mounted on an arm 424 secured to one end of a flat bracket member 426. The other end of bracket member 426 is connected to one end of a lever 428 by means of a connecting rod 430 generally disposed rearwardly of mower 20. The other end of lever 428 is fixedly mounted by means of a stud 432 to an inverted U-shaped bearing support 434 for rear wheel and tire 24. It is readily apparent from an observation of FIG. 2 that as steering wheel 402 is rotated in the direction shown by the arrow associated therewith, flat bracket member 426 is forced to rotate in the manner shown by its arrow thereby pulling forward connecting rod 430 and rotating lever 428, as shown by their respective arrows. Consequently, tire 24 turns with U-support 434 to provide a right movement for lawnmower 20. A left movement of lawnmower 20 is provided, in a similar manner, when steering wheel 402 is rotated in a direction opposite to its associated arrow.

A rigid frame 440 welded transversely across open frame 22 is provided for rotatably supporting stud 432 centered therethrough. An operator's seat 442 is suitably mounted on frame 22, as shown in FIG. 1, over the heretofore described steering means for the purpose of providing immediate ground traction to rear tire 24 when the operator of the vehicle sits thereon.

In the operation of machine 20, engine 21 is started in a conventional manner. A pivotal accelerator foot pedal (not shown) is suitably mounted on one of the foot rests 450 (FIG. 1) and is connected in a usual manner such as by wire linkage leading to the throttle and carburetor, etc., of engine 21. To propel machine 20 across ground, transmission 30 is engaged into one of the three gears, low, high or reverse, and thereafter the foot pedal depressed to throttle engine 21. It should be noted that the combination of an automatic clutch 28 and transmission 30 provides for a safety advantage wherein machine 20 does not move although a gear is engaged but the foot pedal is not depressed and engine 21 is idling, the reason being that automatic clutch 28 as distinguished from a friction-type clutch is controlled by the engine r.p.m. or torque developed in its drive shaft which is in turn controlled by the foot pedal.

To provide for high speed movement of machine 20, lever 97 is pivoted on ball 115 so that shifter fork 53 is advanced forwardly on crankshaft 49 by means of lever end 96 engaging recess 95 in sleeve 92 on arm 86, whereby combination member 51 engages and locks upon driving clutch member 47 fixedly mounted to shaft 35 which rotates with the speed of the driveshaft (not shown) of engine 21. Consequently shaft 49 obtains the same r.p.m. as the engine speed, and same is transmitted, as shown in FIG. 8, to axle 25 and tires 24.

To provide for a relatively low speed forward of machine 20 lever 97 is pivoted on ball 115 so that shifter fork 66 is advanced forwardly on shaft 49 by means of lever end 96 engaging recess 98 on arm 87, whereby low gear 65 meshes with idler cluster gear 70 about shaft 71. Since gear 70 is mounted with gear 74 on sleeve 73 about shaft 71, and gear 74 is in continuous mesh with M.D. gear 45 on shaft 35, gear 65 and shaft 49 rotate in the same direction as shaft 35, however, at a slower speed because of gearing ratios of the involved gears. Consequently, the power to axle 25 and tires 24 is less, and forward movement of machine 20 is slower.

To provide for reverse movement of machine 20, lever 97 is pivoted on ball 115 so that shifter fork 53 advances rearwardly on crankshaft 49 by means of lever end 96 engaging recess 95 of sleeve 92 on arm 86, whereby gear 80 on combination member 51 meshes with reverse idler gear 83. Gear 83 bushingly mounted on fixed reversing shaft 81 is rotating continuously as a result of its being in mesh with cluster gear 70. Consequently, when gear 80 meshes with gear 83, a reverse direction of rotation to that of shaft 35 is imparted to crankshaft 49 which in turn transmits reverse motion to machine 20 through the power train shown in FIG. 8 to tires 24.

To provide for transmission of power to reel mechanism 185, lever 168 is pivoted about pin 170 so that shifter fork 159 with arm 162 advances rearwardly on shaft 143 by means of the tang (not shown) on the end of lever 168 engaging groove 171 of arm 162, whereby driven clutch member 148 engages driving clutch member 150 of combination member 140 that also carries gear 142 continuously in mesh with and rotating with M.D. gear 45 when the latter is rotating. Combination member 140 is mounted on a bushing (not shown) about shaft 143 so that power from shaft 35 through M.D. gear 45 can only be transmitted to shaft 143 when members 150, 148 engage and lock as a result of the rearward shifting of shifter fork 159. Consequently, bevel gear 151 keyed to shaft 143 rotatively reacts, as does bevel gear 152 to meshing bevel gear 151, and as does s.p.o. shaft 155 formed integrally with bevel gear 152. Power from shaft 155 is thence transmitted to reel mechanism in accordance with the chain and sprocket power train illustrated in FIG. 8.

It should now be apparent that the reel blades can be actuated independently of motion of machine 20, by the manipulation of lever 168. The r.p.m. of shaft 35 governs the speed of the reel blades, and the distinct advantage of the combination of the immediately foregoing description of gearing to shaft 155 and an automatic clutch 28 is that the reel blades do not rotate at idle speed of engine 21, since clutch 28 is controlled by a higher engine r.p.m. or torque developed in its drive shaft which is in turn controlled by the operator's foot pedal. On the other hand, lodgement of an object between the bed knife means 275 and a reel blade or blades causes cessation of travel of machine 20 because of slippage occurring between automatic clutch 28 and drum 29 and thereby not rotate shaft 35 attached to drum 29. After disengaging clutch members 148, 150 on shaft 143 by manipulating shifter fork 159 on lever 168, removal of such object may be had in complete safety while engine 21 continues to run.

It should now be apparent that whenever the operator's foot is removed from the engine's control pedal, the r.p.m. of the shaft of engine 21 drops below the necessary speed at which automatic clutch 28 engages or firmly grips drum 29. Consequently, even though lever 97 is engaged with its gearing components in high, low, or reverse, machine 20 stops. Likewise, the reel blades no longer rotate should lever 168 engage its gearing components and the operator's foot pedal is not depressed (engine idlying, i.e.).

The three-point-to-ground suspension provided by tires 24, with but one of such tires disposed at its rear, assumes that tractor or machine 20 hugs ground contour, particularly in the area forward of engine 21 at which reel mechanism 185 is located. It is clear, however, that such suspension falls short of inclusion of reel housing 202 and mechanism 185 as a result of their free or floating position upon ground surface as a result of the trunnion mounting provided for such forwardly disposed elements.

Housing 202 including walls 227, 228 and a rear wall 455 (FIG. 1) suitably attached thereto provides for containment of cut grass and the like. As such grass is swept up by efficient shearing action, it completes a loop directed forwardly of machine 20. Heavier or lengthier cut grass fragments return to the cutting action of reel blades and bed knife by falling into the reel. This motion is compounded and cycled continuously with large grass fragments not capable of falling below bed plate knife means 275. Consequently, a highly effective fragmentary cutting-up of grass regardless of rank or massiveness is achieved. The enclosure provided by housing 202 further eliminates danger of flying stones, sticks, etc. that are slung indiscriminately rearwardly of the reel blades and knife therefor whose cooperation may cause such flying.

The operation for the steering mechanism illustrated in FIG. 2 and described above is evident therefrom.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced otherwise than as specifically described and exemplified herein, by those skilled in the art, and having the benefit of this disclosure.

Therefore, what I claim to be patentably novel is:

1. A machine for propelling a work implement or the like comprising in combination,
   a frame,
   an engine mounted on said frame,
   a transmission engageable with said engine, said transmission including
      a power output shaft and
      a power take-off means,
   a three-point-to-ground suspension for said frame and machine and including
      an axle disposed below said engine, tires mounted on said axle,
      a rearwardly disposed rotatably mounted tire means, said tires and tire means supporting said frame,
   a first power train connecting said power output shaft to said axle for providing motive power for said machine,
   steering means for said machine connected to said tire means,
   a pair of forwardly extending levers pivotally attached at their rear ends to said frame,
   a cross-bar disposed forwardly of said engine and being securely attached to said levers,
   a depending bracket means including
      a trunnion mounting for cooperative association with the work implement rigidly supported at each of the respective ends of said cross-bar,
   a second power train connecting said power take-off means in said transmission to said trunnion mounting whereby power from said engine through said transmission is transmittable to the work implement, and
   means in said trunnion mounting for connecting the work implement to said machine.

2. The machine of claim 1 in which said second power train comprises a linkage mechanism connecting said power take-off means to said trunnion mounting.

3. The machine of claim 1 including means for pivoting said forwardly extending levers vertically about said frame whereby said cross-bar, bracket means and trunnion mounting for the work implement are swingable up off the ground.

4. The machine of claim 1 including a work implement mounted between the mounting in said bracket means.

5. The machine of claim 4 in which said work implement comprises
   a reel mechanism,
   a bed plate knife means in cooperative relationship with said reel mechanism, and
   a means for supporting said reel mechanism and bed plate knife means above ground service.

6. The machine of claim 5 in which said supporting means includes a roller means for adjusting the height of the work implement, and casters cooperating with said roller means for supporting the work implement.

References Cited

UNITED STATES PATENTS

| | | | |
|---|---|---|---|
| 2,674,837 | 4/1954 | Buck | 56—249X |
| 2,869,309 | 1/1959 | Benson | 56—26X |
| 2,929,190 | 3/1960 | Woody | 56—26X |
| 2,971,314 | 2/1961 | Lewis | 56—26 |
| 3,096,606 | 7/1963 | Weir | 56—26 |
| 3,097,465 | 7/1963 | Williams | 56—26X |
| 3,177,638 | 4/1965 | Johnson | 56—26X |
| 3,267,654 | 8/1966 | Hanson et al. | 56—26 |
| 3,410,063 | 11/1968 | Speiser | 56—249X |

FOREIGN PATENTS

| | | | |
|---|---|---|---|
| 289,954 | 6/1965 | Netherlands | 56—26 |

RUSSELL R. KINSEY, Primary Examiner

J. N. ESKOVITZ, Assistant Examiner

UNITED STATES PATENT OFFICE
CERTIFICATE OF CORRECTION

Patent No. 3,566,590　　　　　　　　Dated March 2, 1971

Inventor(s) Carl Van Ausdall

It is certified that error appears in the above-identified patent and that said Letters Patent are hereby corrected as shown below:

Column 17, line 34, "axle," should read -- axle, and --.
Column 18, line 25, "service" should read -- surface --.

Signed and sealed this 30th day of November 1971.

(SEAL)
Attest:

EDWARD M. FLETCHER, JR.　　　　　ROBERT GOTTSCHALK
Attesting Officer　　　　　　　　Acting Commissioner of Paten